Patented Dec. 17, 1929

1,740,115

UNITED STATES PATENT OFFICE

ROBERT C. PALMER, OF PENSACOLA, FLORIDA, ASSIGNOR TO THE NEWPORT COMPANY, OF CARROLLVILLE, WISCONSIN, A CORPORATION OF DELAWARE

PROCESS OF EXTRACTING TURPENTINE, PINE OIL, AND ROSIN FROM RESINOUS WOODS

No Drawing.    Application filed December 4, 1926.   Serial No. 152,724.

This invention relates to a process for extracting turpentine, pine oil and rosin from resinous woods by means of a solvent for the turpentine, pine oil and rosin.

The extraction of the valuable constituents of resinous woods, such as turpentine, pine oil and rosin is commonly practised in the industrial arts by subjecting previously comminuted wood to the action of steam, thereby separating the turpentine and a part of the pine oil, and then applying a suitable solvent such as petroleum naphtha, benzene and the like to extract the remaining pine oil and rosin. The oil recovered by the steam extraction is later separated into its constituents of turpentine and pine oil by well known methods of fractional distillation, and the pine oil and rosin are separated from the solvent and recovered from the extract also by known established practices of distillation. These established methods, when properly carried out, produce a high quality turpentine and pine oil, but the rosin, because of the steam treatment, has been detrimentally changed from the original form in which it existed in the wood, both as to its physical and chemical properties.

It is therefore an object of this invention to provide a method of extracting the rosin, together with the turpentine and pine oil without subjecting the rosin in the natural wood to a preliminary contact with steam.

It is a further object of this invention to provide a suitable solvent for the extraction of turpentine, pine oil and rosin from resinous woods that may be properly separated from the turpentine and pine oil and that does not have any objectionable qualities as regards the rosin itself.

Other and further important objects of this invention will be apparent from the following description and the appended claims.

I have found that certain of the constant boiling polymerized olefines which are obtained by dehydration and polymerization of the higher alcohols are ideally suited for the process of extracting turpentine, pine oil and rosin from resinous woods. While there are a number of such polymerized olefines, such as di-isoamylene, di-isopropylethylene siutable for this process, the preferred solvent is di-isobutylene, a constant boiling body having a boiling point between 102 and 103° C. Di-isobutylene, which is obtained by the dehydration of tri-methyl carbinol and subsequent polymerization, is a good solvent for only the resinous constituents that are most desired in a commercial rosin. It can be completely separated from turpentine without leaving a trace of odor, thereby overcoming one of the objections to the present coal tar derivative solvents. Furthermore, di-isobutylene is readily volatilized with a small amount of steam, so that it may be practically entirely recovered from saturated chips at slight expense. Its boiling point is sufficiently low to permit evaporation with indirect steam at a moderate pressure, thus also contributing to the economy of the process.

While I do not desire to limit my invention to any particular procedure, the following description will serve to illustrate a preferred method for carrying out the process:

The resinous wood, which has previously been properly prepared in comminuted form, is extracted in an extraction vessel with di-isobutylene at or near its boiling point. The percentage of di-isobutylene to be used in this extraction process will depend in part upon the nature of the wood and its resinous content and may, in any event, be accurately determined by practice or by a small scale extraction. When the di-isobutylene extract has reached the desired, or optimum concentration of rosin, it is withdrawn from the extraction vessel and additional solvent introduced into the vessel if desired, to complete the extraction.

The hot extract may be washed with water in order to cool and precipitate the small amount of pitch which is extracted by the turpentine and pine oils that come out with the rosin. This step, however, is not essential and may be omitted.

The di-isobutylene extract containing rosin, turpentine and pine oil is then placed in an ordinary still provided with a jacket or closed coils and with a simple still head and subjected to distillation, using indirect heat, such as steam at about 50 lbs. gauge pressure, or whatever heat will give a rapid, economical distillation of the solvent. After the bulk of the solvent has been removed, as determined by an indication that the turpentine is distilling over with the solvent, the vapors are no longer passed out through the simple still head, but are passed through a fractionating column until the separation of the di-isobutylene is complete. The vapors are then passed back through the simple still head and steam at approximately 50 lbs. gauge pressure is introduced directly into the extraction mass until all of the turpentine and pine oils have been removed from the rosin. The finished rosin is then withdrawn from the still.

The separation of the turpentine and pine oil may be accomplished by well-established methods of steam fractionation.

The rosin obtained by this method is of a quality considerably higher than can be obtained by a process in which the turpentine and pine oil are first extracted from the wood by means of steam.

It will thus be apparent that di-isobutylene possesses many advantages over solvents heretofore used. The use of turpentine as a solvent, for instance, is objectionable because of the high cost of the turpentine and the high cost of steam for separating the turpentine from the rosin. Furthermore, large losses are suffered using turpentine as a solvent, due to its ready oxidation and retention in the wood fiber. Coal tar derivatives boiling below turpentine, such as benzol and toluol, are not commercially practicable because they act as solvents of materials existing in the wood other than the rosin, thereby necessitating chemical treatment with acids and alkalies, which treatments are detrimental to the properties of the recovered rosin. The commercially obtainable petroleum naphthas are also not suitable, because they either contain fractions which boil in the range of turpentine or they form constant boiling mixtures with turpentine, making it impossible to separate the turpentine. The polymerized olefines, and more particularly di-isobutylene, have none of the objectionable qualities or characteristics above mentioned and therefore serve as excellent solvents for a one-stage extraction process, by which the turpentine and pine oil as well as the rosin may be simultaneously extracted from resinous woods, the subsequent obtaining of a high quality rosin from the extract being of easy accomplishment.

I am aware that numerous details of the process may be varied through a wide range without departing from the spirit of this invention and I do not desire limiting the patent granted hereon otherwise than as necessitated by the prior art.

I claim as my invention:

1. In the process of extracting turpentine, pine oils and rosin from resinous woods, the step of subjecting the wood to the solvent action of polymerized olefines.

2. In the process of extracting turpentine, pine oils and rosin from resinous woods, the step of subjecting the wood to the solvent action of di-isobutylene.

3. In the process of extracting turpentine, pine oils and rosin from resinous woods, the step of subjecting the unsteamed wood to the solvent action of di-isobutylene, whereby the turpentine, pine oils and rosin are simultaneously and practically completely extracted from the wood.

4. In the process of extracting turpentine, pine oils and rosin from resinous woods, the step of subjecting the unsteamed wood to the solvent action of a polymerized olefine having a boiling point lower than turpentine, whereby the turpentine, pine oils and rosin are simultaneously and practically completely extracted from the wood.

In testimony whereof I have hereunto subscribed my name.

ROBERT C. PALMER.